Figure 1:
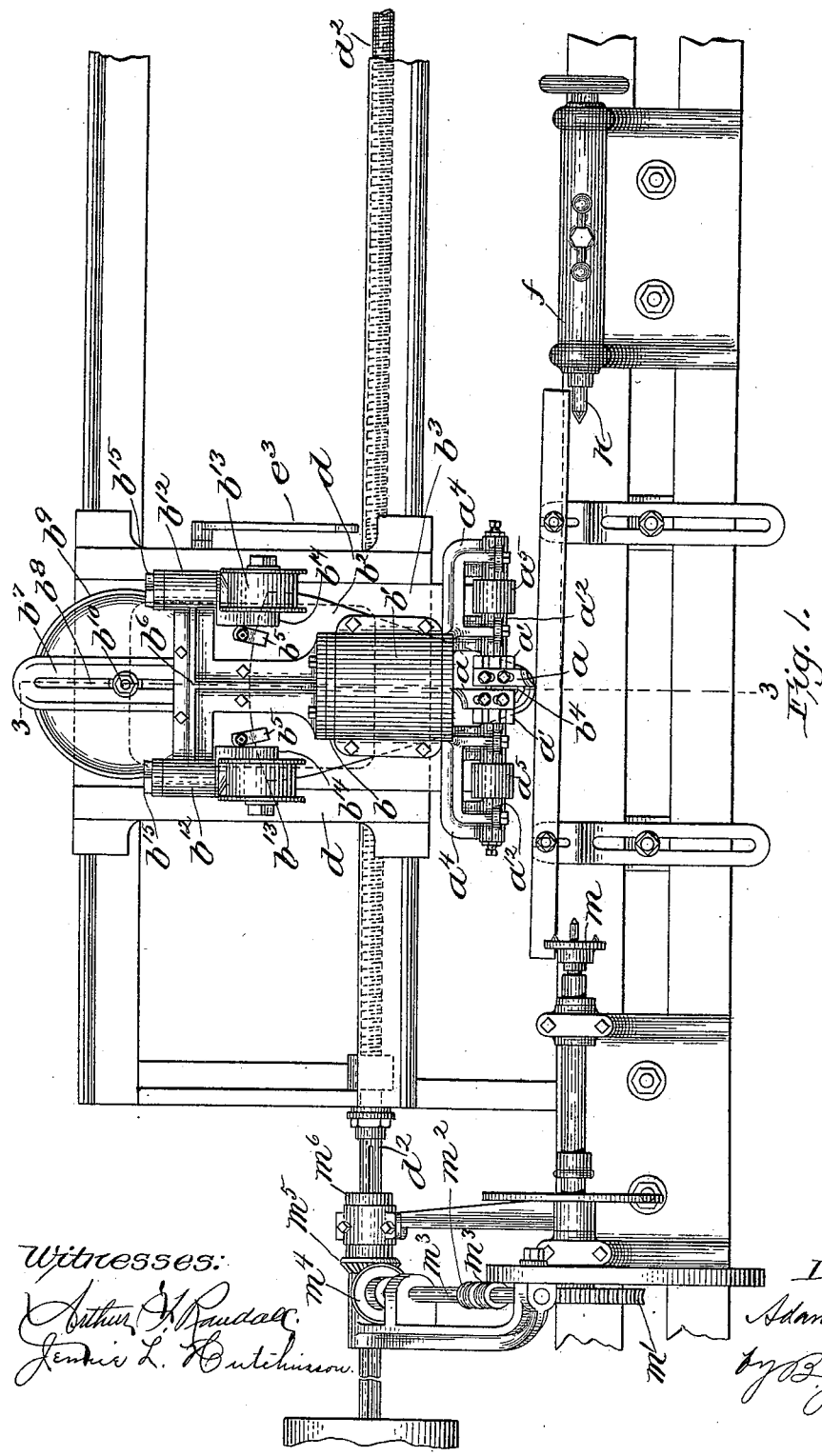

No. 621,801. Patented Mar. 28, 1899.
A. DICKEY.
MOLDING MACHINE.
(Application filed May 16, 1898.)
(No Model.) 3 Sheets—Sheet 1.

Witnesses:
Arthur H. Randall
Jennie L. Hutchinson

Inventor:
Adam Dickey
by B. J. Noyes
Atty.

No. 621,801. Patented Mar. 28, 1899.
A. DICKEY.
MOLDING MACHINE.
(Application filed May 16, 1898.)
(No Model.) 3 Sheets—Sheet 2.
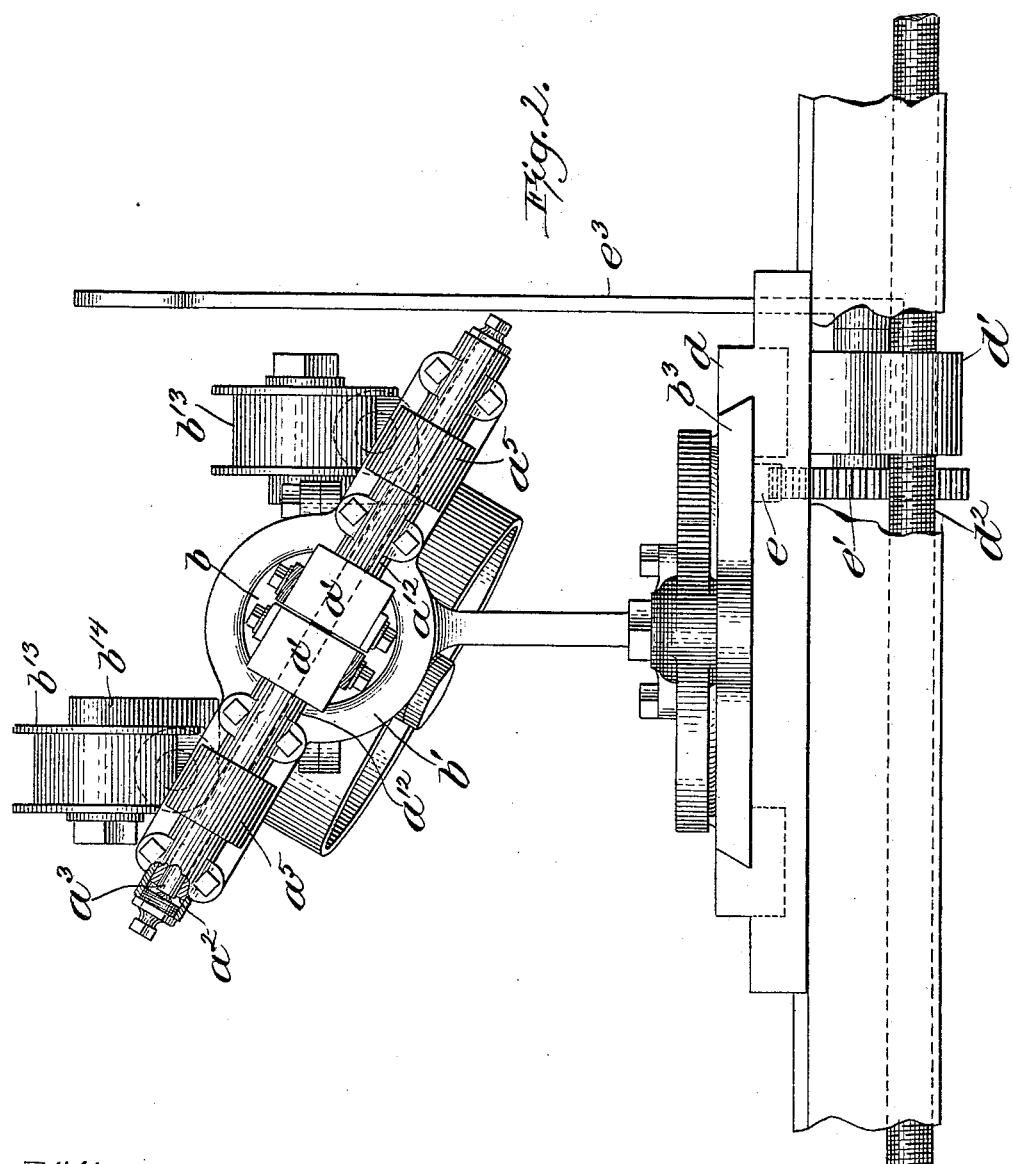
Witnesses:
Arthur H. Randall.
Jennie L. Hutchinson
Inventor:
Adam Dickey
By P. J. Hayes,
Atty.

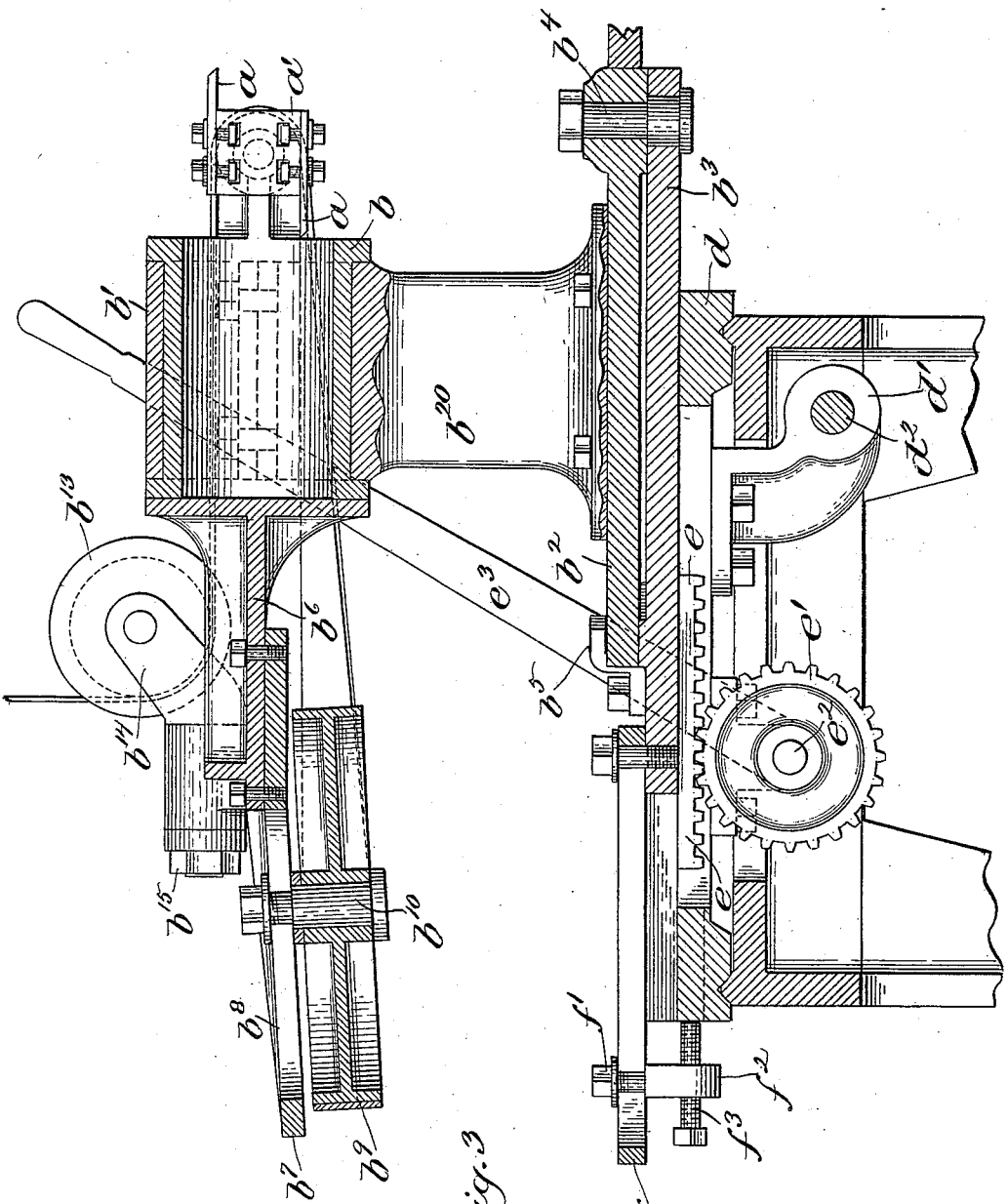

UNITED STATES PATENT OFFICE.

ADAM DICKEY, OF BOSTON, MASSACHUSETTS.

MOLDING-MACHINE.

SPECIFICATION forming part of Letters Patent No. 621,801, dated March 28, 1899.

Application filed May 16, 1898. Serial No. 680,774. (No model.)

*To all whom it may concern:*

Be it known that I, ADAM DICKEY, of Boston, county of Suffolk, and State of Massachusetts, have invented an Improvement in Molding-Machines, of which the following description, in connection with the accompanying drawings, is a specification, like letters on the drawings representing like parts.

This invention relates to molding-machines especially adapted for forming spiral moldings, and it is intended as an improvement upon the molding-machine shown in the United States Patent No. 251,497, dated December 27, 1881.

The invention has for its object to improve and simplify the construction of the machine shown in said patent.

The molding-machine embodying this invention has a pair of oppositely-rotating cutters which are supported by a hub which is adjustable on an axis at right angles to the axis of rotation of the cutters borne by it, and the support for said hub is made adjustable on an axis at right angles to the axis of said hub, and said adjustable support for said hub is borne by a base-plate which is adapted to slide in and out—*i. e.*, toward and from the work. A carriage is provided for said sliding base-plate, and said carriage is adapted to be moved back and forth on a bed provided for it. Head and tail stocks are provided and means employed for rotating one or both of them, and said means is connected with the means employed for moving the aforesaid carriage back and forth in order that said parts may operate in unison. The head and tail stocks are mounted on a bed which is made very long—say several times longer than the bed on which the carriage bearing the cutters is mounted—and said head and tail stocks are adapted to be moved along the bed and to be fixed at any part thereof. Such provision is essential for long work—*i. e.*, work longer than the travel of the carriage bearing the cutters. The means for moving the carriage and for rotating the head-stock is so constructed that the head-stock may be moved back and forth along the bed and operative connection of the parts still retained.

In the patent referred to the oppositely-rotating cutters are driven by a friction-disk; but in practice such means of rotating the cutters is entirely inexpedient for many reasons, and in lieu thereof I herein employ a belt or belts. As herein shown, the oppositely-rotating cutters are secured to sleeves mounted on an arbor borne by a hub. A belt-pulley is secured to each sleeve, and at the rear of said pair of belt-pulleys another pair of belt-pulleys is provided, which are supported by a frame borne by the hub, and said belt-pulleys are located opposite the belt-pulleys on the sleeves, and the supports for said belt-pulleys are independently adjustable on axes in parallelism with the axis of the hub bearing them, being at right angles to the axes of the pulleys which are borne by the supports. An intermediate pulley is provided, around which a belt passes in traveling from the belt-pulley on one sleeve to the belt-pulley on the other sleeve. The belt passes under one of the rearmost pulleys, thence over the pulley on one of the sleeves, thence around the intermediate pulley, and then under the pulley on the other sleeve, and then under the other rearmost pulley. The belt-pulleys on the sleeves are thus driven in opposite directions, to thereby oppositely rotate the cutters.

By adjusting the supports for the rearmost belt-pulleys on axes in parallelism to the axis of the hub said belt-pulleys may be caused to rotate in vertical planes regardless of the position of the hub bearing them.

Figure 1 shows in plan view a spiral-molding machine embodying this invention. Fig. 2 is a front elevation of a portion of the machine, showing the cutters and operating mechanism therefor, said cutters being set to rotate on an oblique axis. Fig. 3 is a vertical section of the machine shown in Fig. 1, taken on the dotted line 3 3.

The cutters $a$, of any suitable shape and construction, are attached to cutter-heads $a'$, secured to the adjacent ends of sleeves $a^2$, which are disposed in alinement and mounted upon an arbor $a^3$, said arbor being supported by projecting arms $a^4$, secured to and projecting in opposite ways from a hub $b$. The sleeves $a^2 a^2$ are contained in boxes $a^{12}$. Belt-pulleys $a^5$ are secured to the sleeves $a^2$, and the belt which passes over said pulleys is arranged to rotate them in opposite directions, so that the cutters $a$ will be rotated in opposite directions.

The hub $b$ is contained in a box or support $b'$ at the upper end of a stand $b^{20}$, which is bolted to a plate $b^2$ and pivotally connected to a plate $b^3$, as by a pivot-pin $b^4$. The hub $b$ is adjustable in the box or support $b'$ provided for it on a horizontal axis which is at right angles to the axis of rotation of the cutters, and the plate $b^2$, which bears the box or support $b'$ for said hub $b$, is adapted to be adjusted on an axis at right angles to the axis of said hub $b$. The plate $b^2$ is held in its adjusted position by clamps $b^5$. The T-shaped frame $b^6$ is attached to the rear end of the hub $b$ and projects rearwardly, and said frame has fixed to it a rearwardly-projecting bar $b^7$, which is slotted at $b^8$, and an intermediate pulley $b^9$ is suspended from a pivot-bolt $b^{10}$, set in the slot of said plate $b^7$, and said intermediate pulley receives upon it the belt, which travels from one of the belt-pulleys $a^5$ to the other. The frame $b^6$ has a boss at each side constructed to serve as a bearing $b^{12}$ for a support $b^{14}$, and said supports $b^{14}$ occupy horizontal positions and bear a pair of belt-pulleys $b^{13}$, and said supports $b^{14}$ are capable of adjustment upon loosening nuts $b^{15}$ on their axes at right angles to the axis of rotation of the belt-pulleys $b^{13}$ borne by them. This adjustment of the pulleys $b^{13}$ is provided in order that said pulleys may always turn on horizontal axes in parallelism to the axis of the counter-shaft regardless of the adjustment of the hub $b$, so as to properly receive the belt from said shaft. The counter-shaft will be made as a long cylindrical drum, and the belt will pass over said drum and under one of the pulleys $b^{13}$, then over one of the pulleys $a^5$, thence around the intermediate pulley $b^9$, thence under and around the other pulley $a^5$, and under the other pulley $b^{13}$ to the drum, so that it will be seen that a single belt may be employed to thus oppositely rotate the cutters. The intermediate pulley $b^9$ by reason of its adjustment in the slot $b^8$ will take up any slackness of the belt.

It will be seen that the oppositely-rotating cutters may be set to turn on horizontal axes or on any axis oblique thereto by adjusting the hub $b$ in the box $b'$, and that by adjusting the plate $b^2$ on its pivot said cutters may be set to rotate on an axis oblique to the work, and in whatever position said cutters may be set the belt-pulleys $b^{13}$ may be adjusted so as to turn on axes in parallelism to the counter-shaft. The base-plate $b^3$ is adapted to slide in and out or transversely to the bed in ways provided for it in a carriage $d$, and said carriage has a depending block $d'$ or nut, which receives a screw $d^2$, extending lengthwise the machine, and by turning said screw said carriage and parts supported by it will be moved back and forth.

A rack $e$ is secured to the under side of the sliding base-plate $b^3$, which is engaged by a pinion $e'$, attached to a short shaft $e^2$, having its bearings in the carriage, and a hand-lever $e^3$ is secured to said shaft $e^2$, and as said hand-lever $e^3$ is operated the plate $b^3$ will be moved in and out or toward and from the work. The plate $b^3$ has attached to and projecting from its rear end a slotted bar $f$, through the slot of which extends a bolt $f'$, having suspended from it an ear $f^2$, through which passes an adjusting-screw $f^3$, which is disposed to strike the frame of the carriage, and thereby limit the movement of the plate toward the work. The tail-stock $n$ is of any usual or suitable construction and adjustably clamped to the bed of the machine, and the head-stock $m$ may also be of any usual or suitable construction and likewise adjustably clamped to the bed of the maching.

The bed of the machine is made quite long—say much longer than the travel of the carriage $d$—and the head and tail stocks may be fixed to said bed at any point desired. This is important for long work—as, for instance, suppose the travel of the carriage $d$ is three feet and the bed twelve feet, a long strip can be supported by the head and tail stocks and a portion of it acted upon, and then said head and tail stocks may be moved along and another portion acted upon, and so on. A worm-wheel $m'$ is fixed to the shaft of the head-stock, which is engaged by one or another worm $m^2$ on the oblique shaft $m^3$, which is set in bearings provided for it, and said oblique shaft has at its lower end a bevel-gear $m^4$, which is engaged by a bevel-gear $m^5$, secured to a sleeve $m^6$, splined on the screw-rod $d^2$. By this means of connection it will be seen that the shaft of the head-stock $m$ and the screw $d^2$ are connected so as to be turned relatively to each other.

By splining the sleeve $m^6$ on the shaft $d^2$ it will be seen that the operating mechanism connecting said shaft $d^2$ and head-stock may by moved with said head-stock, it being understood that the shaft $d^2$ will be made of any length desired.

I claim—

1. In a spiral-molding machine, the combination of a pair of oppositely-rotating cutters, bearings therefor, a hub supporting said bearings adjustable on an axis at right angles to the axis of said cutters and a support for said hub adjustable on an axis at right angles to the axis of said hub, substantially as described.

2. In a spiral-molding machine, a pair of oppositely-rotating cutters, bearings therefor, a hub supporting said bearings adjustable on an axis at right angles to the axis of said cutters, a support for said hub pivoted to turn on an axis at right angles to the axis of said hub, and a sliding base-plate to which said support is pivoted, substantially as described.

3. In a spiral-molding machine, a pair of oppositely - rotating cutters, sleeves bearing them, belt-pulleys thereon, bearings for said sleeves, a hub supporting said bearings adjustable to turn on an axis at right angles to the axis of said cutters, a frame attached to said hub, an intermediate pulley borne by said frame, and a pair of belt-pulleys also borne by said frame and arranged opposite the belt-pulleys on the sleeves, substantially as described.

4. In a spiral-molding machine, a pair of oppositely-rotating cutters, sleeves bearing them, belt-pulleys thereon, bearings for said sleeves, a hub supporting said bearings adjustable to turn on an axis at right angles as to the axis of said cutters, a frame attached to said hub, an intermediate pulley borne by said frame, and a pair of belt-pulleys arranged opposite said belt-pulleys on the sleeves, supports therefor borne by said frame adjustable on axes at right angles to the axes of the pulleys supported by them, substantially as described.

5. In a spiral-molding machine, a pair of oppositely-rotating belt-pulleys and correspondingly-rotating cutters, an intermediate belt-pulley, a hub adjustable on an axis at right angles to the axis of said cutters and bearing all of the aforesaid parts, another pair of oppositely-rotating belt-pulleys arranged opposite the aforesaid pair, supports therefor borne by said hub independently adjustable on axes at right angles to the axes of the pulleys supported by them, substantially as described.

6. In a spiral-molding machine, a pair of oppositely-rotating belt-pulleys and correspondingly-rotating cutters, an intermediate belt-pulley, a hub adjustable on an axis at right angles to the axis of said cutters and bearing all of the aforesaid parts, another pair of oppositely-rotating belt-pulleys arranged opposite the aforesaid pair, supports therefor borne by said hub independently adjustable on axes at right angles to the axes of the pulleys supported by them, and a support for said hub adjustable on an axis at right angles to the axis of said hub, substantially as described.

7. In a spiral-molding machine, a hub adjustable on a horizontal axis carrying a pair of oppositely-rotating cutters, a pair of oppositely-rotating belt-pulleys for said cutters, another pair of oppositely-rotating belt-pulleys, supports therefor borne by said hub and adjustable on horizontal axes in parallelism with the axis of said hub, substantially as described.

8. In a spiral-molding machine, a hub adjustable on a horizontal axis carrying a pair of oppositely-rotating cutters, a pair of oppositely-rotating belt-pulleys for said cutters, another pair of oppositely-rotating belt-pulleys, supports therefor borne by said hub and adjustable on horizontal axes in parallelism with the axis of said hub, and a support for said hub adjustable on a vertical axis, substantially as described.

9. In a spiral-molding machine, a pair of oppositely-rotating cutters, sleeves bearing them, belt-pulleys on said sleeves, a hub and arms projecting therefrom in opposite ways provided with bearings for said sleeves, a box in which said hub is adjustable on its axis, a rearwardly-projecting frame secured to and turning with said hub, a pair of belt-pulleys borne by said frame and an intermediate belt-pulley also borne by said frame, substantially as described.

10. In a spiral-molding machine, a pair of rotating cutters, bearings therefor, a hub supporting said bearings adjustable on an axis at right angles to the axis of said cutters, a support for said hub adjustable on an axis at right angles to the axis of said hub, a base-plate to which said support is pivoted, means for moving said base-plate in and out, a carriage in which said base-plate slides and means for moving said carriage back and forth, substantially as described.

11. In a spiral-molding machine, a hub adjustable on a horizontal axis carrying a pair of oppositely-rotating cutters, a pair of oppositely-rotating belt-pulleys for said cutters, another pair of oppositely-rotating belt-pulleys, supports therefor borne by said hub and adjustable on horizontal axes in parallelism with the axis of said hub, an intermediate belt-pulley borne by said hub, a pivoted support for said hub, and a sliding base-plate bearing said support, substantially as described.

12. In a spiral-molding machine, a combination of a pair of oppositely-rotating cutters and a hub bearing them adjustable on an axis at right angles to the axis of said cutters, a pivoted support for said hub and a sliding base-plate bearing said pivoted support, head and tail stocks, and means for rotating said head-stock, substantially as described.

13. In a spiral-molding machine, a combination of a pair of oppositely-rotating cutters, a hub bearing them adjustable on an axis at right angles to the axis of said cutters, a pivoted support for said hub and a sliding base-plate bearing said pivoted support, a carriage in which said base-plate slides and means for moving said carriage and parts borne by it back and forth, head and tail stocks and means for rotating one of them in either direction, substantially as described.

14. In a spiral-molding machine, a combination of a pair of oppositely-rotating cutters, a hub bearing them adjustable on an axis at right angles to the axis of said cutters, a pivoted support for said hub, and a sliding base-plate bearing said pivoted support, a carriage in which said base-plate slides and means for moving said carriage and parts borne by it back and forth, head and tail stocks and means for rotating one of them in either direction connected with means employed for moving said carriage back and forth, substantially as described.

In testimony whereof I have signed my name to this specification in the presence of two subscribing witnesses.

ADAM DICKEY.

Witnesses:
B. J. NOYES,
JENNIE L. HUTCHINSON,